United States Patent [19]
Shepherd

[11] Patent Number: 5,451,268
[45] Date of Patent: Sep. 19, 1995

[54] PROCESS FOR THE REMOVAL OF SULFUR FROM SILVER

[76] Inventor: Samuel L. Shepherd, 5211 Mulberry Grove, Kingwood, Tex. 77345

[21] Appl. No.: 151,911

[22] Filed: Nov. 15, 1993

[51] Int. Cl.⁶ .................. B08B 7/04; B01J 20/34; B01J 38/64
[52] U.S. Cl. .................... 134/42; 134/25.2; 95/135; 210/660; 210/670; 423/230; 423/244.02; 502/25
[58] Field of Search ........... 134/42, 26.2; 208/246, 208/253; 95/135, 136, 137; 210/660, 670, 683; 423/230, 244.02, 244.06; 502/25

[56] References Cited

U.S. PATENT DOCUMENTS

| | | | |
|---|---|---|---|
| 1,741,834 | 12/1929 | Fischer | 423/230 |
| 2,791,540 | 5/1957 | Kimberlin | 208/246 |
| 3,971,712 | 7/1976 | Miller | 423/244.06 X |
| 4,430,205 | 2/1984 | Felsky | 208/246 |
| 4,437,227 | 3/1984 | Hass et al. | 210/683 |
| 4,478,948 | 10/1984 | Rebsdat et al. | 502/25 |
| 5,143,872 | 9/1992 | Weiss et al. | 502/25 |

Primary Examiner—David A. Simmons
Assistant Examiner—Saeed Chaudhry
Attorney, Agent, or Firm—Harrison & Egbert

[57] ABSTRACT

A method of removing sulfur from a fluid including the steps of forming a container with a silver-containing mesh therein, passing the fluid into the container such that the fluid contacts at least a portion of the mesh, adsorbing the sulfur from the fluid onto the mesh, and removing the sulfur from the mesh. The step of removing includes the steps of forming a sulfur-removing solution, interacting the sulfur-removing solution with the adsorbed sulfur on the mesh, and contacting the mesh with an aluminum material during the step of interacting. The solution is heated prior to the step of interacting. The sulfur-removing solution includes the mixture of sodium carbonate with sodium chloride in an aqueous solution. Cayenne pepper is added to the mixture of sodium carbonate and sodium chloride. The mesh is formed by plating silver onto an exterior surface of the mesh and positioning the mesh into the container. The fluid can be aqueous, natural gas, oil, or fossil fuel by-products containing hydrogen sulfide or sulfur dioxide.

11 Claims, 1 Drawing Sheet

PROCESS FOR THE REMOVAL OF SULFUR FROM SILVER

TECHNICAL FIELD

The present invention relates generally to compositions and processes for the removal of sulfur or tarnish from silver. More particularly, the present invention relates to methods for the removal of sulfur from minerals and fluids through the use of silver.

BACKGROUND ART

In general, silver tarnish is the result of silver reacting with sulfur compounds in the air. Over time, a layer of silver sulfide will accumulate on the surface of silver material. For household utensils and silverware, the accumulation of such sulfur on the silver will diminish the value and appearance of the silverware. Often, a great deal of time is devoted to the cleaning of such silver utensils.

In the past, certain chemicals have been available for the removal of tarnish from silver. Some of these chemicals are very corrosive materials. These corrosive materials will remove a layer of silver, along with the tarnish, from the silverware. Also, the use of such corrosive materials can cause pitting in the silver surface of the utensils and silverware. Many of these corrosive materials are carcinogens and cannot be properly disposed of or used in a conventional manner.

Buffing cloths are also available for the removal of tarnish from silver. Typical buffing cloths utilize thiourea for the removal of the tarnish from the silverware. Typically, the buffing cloth is rubbed over the surface of the silverware for the purpose of removing the tarnish. Once again, this buffing technique is an abrasive process for the removal of the tarnish. A film of thiourea will remain on the silverware after the buffing.

Typically, tarnished silverware will exhibit two types of appearance. First, the tarnished pieces exhibit a copper or light brown coloring. This results from the sulfur reacting with the silver so as to form silver sulfide. This reaction depends upon the amount of sulfur in the air. For example, highly industrialized areas will have higher concentrations of sulfur in the air than other areas. The second type of appearance is a black color formed on the silverware. This black appearance results from the accumulation of waste of sulfur-eating bacteria. The bacteria are transported by the air to the surface or crevices of the silver pieces. The bacteria begins to consume the sulfur formed on the silverware. The waste product of the bacteria is a black residue on the silverware.

Heretofore, silver has not been employed for the purpose of removing sulfur from fluids or the sulfur from silver ore. A main motivating reason for the failure to use silver in this process is the inability to properly clean the silver after the accumulation of sulfur. Quite clearly, in the industrial processes, the buffing of silver screens and meshes would be very time consuming and not economically practical. The use of abrasive or corrosive chemicals for the removal of sulfur is also considered an unattractive alternative. Since these abrasive or corrosive materials are potentially carcinogenic, most industrial facilities would have serious problems in the disposal of such cleaning materials. Conventionally, industrial processes will add chemicals to the sulfur-containing fluids for the purpose of chemical removal of sulfur. Unfortunately, in the example of natural gas, the "cleansing" chemicals will remain in the natural gas stream. As a result, these chemicals can produce undesirable emissions when the natural gas is burned. If the sulfur is not removed from the hydrocarbon-containing fluid, then a noxious smell will be emitted when the fluid is burned. Additionally, dangerous sulfur oxides will be emitted during the burning of the fuel.

It is an object of the present invention to provide a composition that effectively removes sulfur from silver.

It is another object of the present invention to provide a process for the removal of sulfur from hydrocarbon and aqueous fluids.

It is a further object of the present invention to provide a process for the removal of sulfur from silver ore.

It is still another object of the present invention to provide a composition for the removal of sulfur from silver that is environmentally safe, biodegradable, and non-hazardous.

It is still another object of the present invention to provide a composition that requires no buffing and will not harm silver.

It is another object of the present invention to provide a composition that quickly and inexpensively removes sulfur from silver.

These and other objects and advantages of the present invention will become apparent from a reading of the attached specification and appended claims.

SUMMARY OF THE INVENTION

The present invention is a composition for the removal of sulfur from silver that comprises the mixture of generally 33 weight percent sodium bicarbonate, 66 weight percent sodium chloride, and 0.02 weight percent of cayenne pepper in an aqueous solution. The aqueous solution includes two to six ounces of the mixture per gallon of water. The mixture can further include a non-oxidized aluminum material.

The present invention is also a method for the removal of sulfur from hydrocarbon and aqueous fluids that includes the steps of: (1) forming a container with a silver-containing mesh therein; (2) passing the sulfur-containing fluid into the container such that the fluid contacts at least a portion of the mesh; (3) adsorbing the sulfur from the fluid onto the mesh so as to form a layer of silver sulfide; and (4) removing the sulfur from the mesh, and regenerating the silver coated mesh.

In the present invention, the step of removing the silver from the mesh is an important step. The step of removing the sulfur from the mesh includes the steps of interacting the sulfur-removing solution with the adsorbed sulfur on the mesh, and contacting the mesh with an aluminum material during the step of interacting. The sulfur-removing solution is heated prior to the step of interacting. Specifically, this solution is heated to a temperature of not less than 180° F.

In the method of the present invention, the step of forming a container comprises the steps of filling a pipe with the silver-containing mesh and attaching the pipe to a pipeline of the hydrocarbon or aqueous fluid such that the pipe is between an inlet and an outlet of the pipeline. The fluid is passed through the pipe such that the sulfur in the fluid is adsorbed onto the mesh prior to exiting the pipe. The pipe is removed from the pipeline, placed into a heated bath having the sulfur-removing solution, and then the mesh in the pipe is contacted with aluminum. The mesh is a silver-plated steel mesh material. The hydrocarbon-containing fluid can be either aqueous, natural gas, oil, or a fossil fuel by-product.

Alternatively, the present invention is also a process for the removal of sulfur from silver ore that includes the steps of: (1) crushing the silver ore into smaller particles; (2) mixing the smaller particles with the sulfur-removing solution; (3) heating the solution to an elevated temperature; and (4) contacting the smaller particles with an aluminum material.

DETAILED DESCRIPTION OF THE INVENTION

Figure 1:
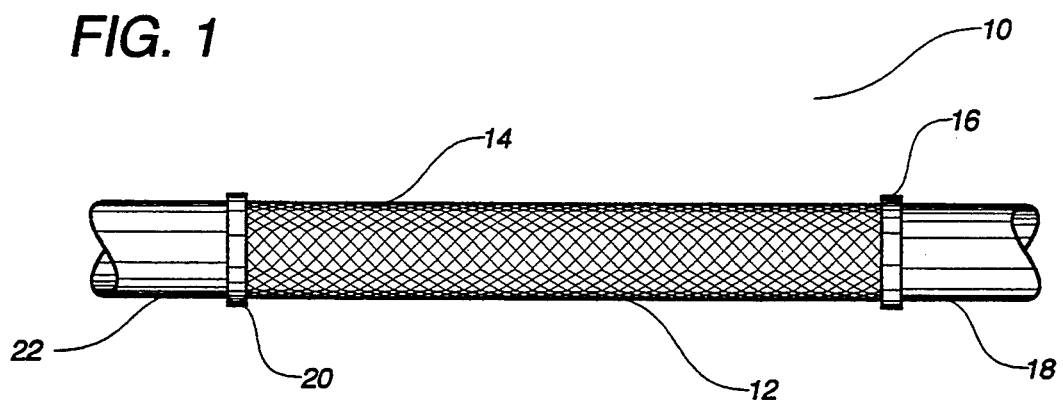
FIG. 1 is a side elevational view of a container used for the purpose of removing sulfur from a hydrocarbon-containing fluid.
Figure 2:
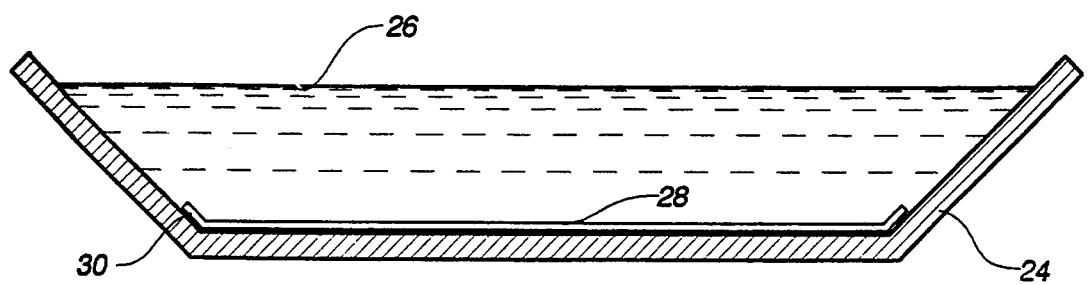
FIG. 2 is a side elevational view of the bath used for the removal of sulfur.

Referring to FIGS. 1 and 2, there is shown at 10 an apparatus which is used in the method of the present invention for the removal of sulfur from a fluid. Specifically, in FIG. 1, it can be seen that the apparatus 10 includes a container 12 that contains a silver-coated, electrically conducting, high surface area mesh 14 therein. It can be seen that the container 12 is fitted at end 16 to an inlet pipe 18. Similarly, the container 12 is fitted at end 20 to an exit pipe 22. The silver-containing mesh 14 Generally fills the interior of the container 12.

In the method of the present invention, the fluid is passed into the container 12 such that the fluid contacts at least a portion of the mesh 14. In the present invention, the fluid can be aqueous, natural Gas, oil, or the by-products of fossil fuel combustion containing hydrogen sulfide and or sulfur dioxide. In each of these fluids, sulfur makes up a significant component. The sulfur in the fluid should be removed from the fluid before the fluid passes from the container 14 into the exit 22. The method of the present invention assures that the sulfur is effectively removed from the fluid prior to exiting the apparatus 10.

Although FIG. 1 shows the container 12 in the form of a pipe, attached to a pipeline made up of the inlet pipe 18 and the outlet pipe 22, it should be kept in mind that the container 12 is more broadly defined. The container 12 can be in the form of a tank, tower, a vessel, an elongated tube, or a tray. As such, the illustration of the pipe 12 is not intended as a limitation on the present invention. It is also important to note that the size, length, and surface area of the mesh 14 (on the interior of the container 12) will be a function of the volume of fluid that is processed through the apparatus 10. The mesh is defined herein as any high surface area, electrically conductive material that includes wire mesh, metal mesh, trays, screen, packing, and similar items. The amount of mesh 14 will also be a function of the sulfur content of the fluid. In the concept of the present invention, the sulfur from the fluid passing through the container 12 will be accumulated on the exterior surfaces of the mesh 14. As such, the sizing of the container 12, and the included mesh 14, must be made to the system requirements for the removal of sulfur.

The mesh 14 is generally silver-plated steel mesh. The silver can be electrolytically plated on the exterior surfaces of the mesh 14 through conventional electrolytic processes. The mesh 14 can be elongated strands of fine steel wire. Alternatively, the mesh 14 can take on the configuration of household steel cleaning pads. The silver-plated mesh 14 is placed within the interior of the container 12 so that it generally fills the interior of the container 12. The flow rate of the fluid should be such that the sulfur will have sufficient time to react with the exterior surfaces of the mesh 14. In normal use, the sulfur is adsorbed onto the silver plating of the mesh material. The sulfur will reside on the exterior surface of the mesh 14 in the form of silver sulfide. The accumulation of the sulfur on the exterior surfaces of the mesh 14 will migrate through the mesh 14 from the inlet end 16 to the outlet end 20. When the sulfur has saturated the silver coating throughout the entire length of the mesh 14 and the container 12, it is necessary to remove the container 12 for the purpose of removing the sulfur from the surfaces of the mesh 14.

The method of the present invention contemplates the forming of a sulfur-removing solution. In FIG. 2, it can be seen that a bath 24 is formed so as to contain the sulfur-removing solution 26 therein. Generally stated, the bath 24 will have a sufficient size so as to accommodate the container 12 therein. It is important to note that the process of the present invention can be employed in various ways, other than through the use of the bath 24 (as illustrated in FIG. 2). For example, the sulfur-removing solution 26 could be effectively utilized by flushing through the interior of the container 12 or in a variety of other ways.

The sulfur-removing solution 24 was developed after a great deal of experimentation. Initially, the solution of the present invention was discovered during cooking activities when food was being prepared in an aluminum pan. Initially, a mixture of baking soda (sodium bicarbonate) and salt (sodium chloride) was mixed with heated water in the aluminum pan. After that mixture was prepared, cayenne pepper was added to the mixture. A tarnished silver spoon was then introduced into the aqueous solution of the sodium bicarbonate, the sodium chloride, and the cayenne pepper. It was found that the tarnish on the silver spoon instantaneously disappeared when the spoon was contacted to a surface of the aluminum pan. The tarnish was not removed when the tarnished silver spoon was not in electrical contact with the aluminum. As a result of this cooking activity, an effective solution for the removal of sulfur from silver was discovered. Initially, it was discovered that the most essential component to the sulfur-removing solution was the silver sulfide. The sodium chloride was added so as to facilitate the electrolytic action between the aluminum and the sodium bicarbonate. After experimentation, it was found that the combination of the sodium bicarbonate and sodium chloride would remove sulfur almost instantaneously at a temperature of 187° F. When cayenne pepper was added to the mixture, the same reaction took place, but at a temperature of only 180° F. Although it is not clear what the quality of the cayenne pepper is that facilitates the sulfur-removing processes, it is believed that an enzyme in the cayenne pepper may facilitate the reaction.

During experimentation with the present silver-removing composition, it was found that the aqueous solution at 70° F. would take approximately four days to remove the sulfur. At 130° F., the sulfur would be removed in approximately four minutes. However, the removal of the sulfur occurred almost instantaneously at temperatures of 180° F. or greater.

The specific formulation of the composition of the present invention utilizes a powdered mixture of two parts sodium bicarbonate, four parts sodium chloride, and 0.0002 parts cayenne pepper. Alternatively, and stated otherwise, the composition of the present invention, in its preferred form, utilizes 33 weight percent sodium bicarbonate, 66 weight percent sodium chloride, and 0.02 weight percent cayenne pepper. This mixture can be made in the form of a dry powder. The mixture is then added to water in an amount of between two to six ounces of the powdered mixture per gallon of water. It is believed that the use of two ounces per gallon is a relatively weak mixture. It has been found that six ounces per gallon is the maximum cost-effective mixture.

In experiments with the composition of the present invention, it was found that the mixture of the sodium chloride and sodium bicarbonate would serve as an effective sulfur-removing solution, even without the cayenne pepper. However, without the cayenne pepper, a greater amount of heat (and energy) is required so as to facilitate the necessary reaction between the solution and the sulfur. The use of cayenne pepper facilitates the economical application of energy to the cleaning process.

In the present invention, aluminum material 28 is positioned in the sulfur-removing solution 26. The use of the non-oxidized aluminum (or base aluminum metal) is required so as to carry out the sulfur-removing reaction. In the process as illustrated in FIG. 2, the container 12 can be placed into the bath 24 and into the solution 26. An end 30 of the aluminum material 28 can be electrically connected to the silver-plated mesh 14 on the interior of the container 12. This contact will establish the necessary electrolytic action so as to facilitate the reaction in which sulfur is almost instantaneously removed from the mesh 14. As a result of this process, the sulfur is reacted so as to be removed from the silver coating on the mesh 14 and will be maintained, in solution, in the form of either sulfuric acid ($H_2SO_4$), hydrogen sulfide ($H_2S$) or aluminum sulfide (AlS). As such, the by-product from the removal of sulfur from the silver-plated mesh 14 is a sellable by-product.

It is also important to note that the solution 26 in the bath 24 should be heated to a temperature in excess of 180° F. The heating of the solution 26 greatly speeds the reaction and further facilitates the ability to remove the sulfur from the mesh 14.

After the sulfur has been removed from the mesh 14, the container 12 can be reattached to the inlet pipe 18 and the outlet pipe 22 of the apparatus 10. The sulfur-cleansing process can then continue, as stated hereinbefore.

The method of the present invention further contemplates the removal of sulfur from silver ore. Normally, silver ore is in the form of AgS or $Ag_2S$. The composition of the present invention can be used so as to effectively remove the sulfur from the silver ore, thereby isolating silver. In the method of the present invention, the silver ore is initially crushed into small particles. These small particles can then be mixed with the sulfur-removing solution. The solution is heated to an elevated temperature, such as above 180° F. Additionally, the crushed particles are then contacted with aluminum materials such that the sulfur is electrochemically, almost instantaneously, removed from the ore. The composition of the present invention allows the sulfur to be removed from the ore without the use of dangerous chemical processes or with expensive and energy-consumptive melting processes. Additionally, the sulfur which is removed from the silver ore is a sellable by-product of the process.

The composition and process of the present invention effectively removes sulfur from silver without dangerous chemicals and without excessive application of energy. Since all of the components of the composition are consumable materials (baking soda, salt, and cayenne pepper), the composition is inherently environmentally safe and non-hazardous. The composition has been found to remove sulfur from silver without removing any of the silver itself. As a result, no pitting, abrasion, or destruction of the silver material occurs. The components of the composition are also very inexpensive. As a result, it becomes possible to remove sulfur from liquid and gaseous fluids, from ore, and from other materials at a relatively modest cost.

The foregoing disclosure and description of the invention is illustrative and explanatory thereof. Various changes in the details of the described method, or in the components of the described composition, may be made within the scope of the appended claims without departing from the true spirit of the invention. The present invention should only be limited by the following claims and their legal equivalents.

I claim:

1. A method of removing sulfur from a fluid comprising the steps of:

passing the fluid into a container having a silver-containing mesh therein such that said fluid contacts at least a portion of said mesh;

adsorbing the sulfur from the fluid onto the mesh;

forming a sulfur-removing solution by mixing sodium bicarbonate with sodium chloride in an aqueous solution;

interacting said sulfur-removing solution with the adsorbed sulfur on the mesh; and contacting said mesh with a base aluminum metal during said step of interacting.

2. The method of claim 1, said step of removing further comprising the step of:

heating said sulfur-removing solution prior to said step of interacting.

3. The method of claim 2, said step of heating comprising the step of:

heating said sulfur-removing solution to a temperature of not less than 180° F.

4. The method of claim 1, said step of forming a sulfur-removing solution comprising:

adding cayenne pepper to the mixture of sodium bicarbonate and sodium chloride.

5. The method of claim 4, said sodium bicarbonate being generally 33 weight percent prior to said aqueous solution, said sodium chloride being generally 66 weight percent prior to said aqueous solution, said cayenne pepper being 0.02 weight percent prior to said aqueous solution.

6. The method of claim 1, said step of forming a sulfur-removing solution comprising the steps of:

combining two parts by weight of sodium bicarbonate with four parts by weight of sodium chloride; and adding the combined sodium bicarbonate and sodium chloride in an amount of two to six ounces per gallon of water.

7. The method of claim 6, said step of combining further comprising:

adding generally 0.0002 parts of cayenne pepper to the combined sodium bicarbonate and sodium chloride.

8. The method of claim 1, further comprising the steps of:

filling a pipe with said silver-containing mesh; and attaching said pipe to a pipeline of said fluid such that said pipe is between an inlet and an outlet of said pipeline.

9. The method of claim 8, further comprising the steps of:

removing said pipe from said pipeline;

placing said pipe into a bath having said sulfur-removing solution therein; and heating said sulfur-removing solution.

10. The method of claim 1, further comprising:

plating silver onto an exterior surface of a steel mesh material; and positioning the silver-plated mesh into the container.

11. The method of claim 1, said fluid being selected from the group consisting of: aqueous, natural gas, oil, and fossil fuel by-products.

* * * * *